Oct. 17, 1967 S. A. MENCACCI 3,347,155
HEAT-TREATING DEVICE
Filed Oct. 28, 1965 4 Sheets-Sheet 1
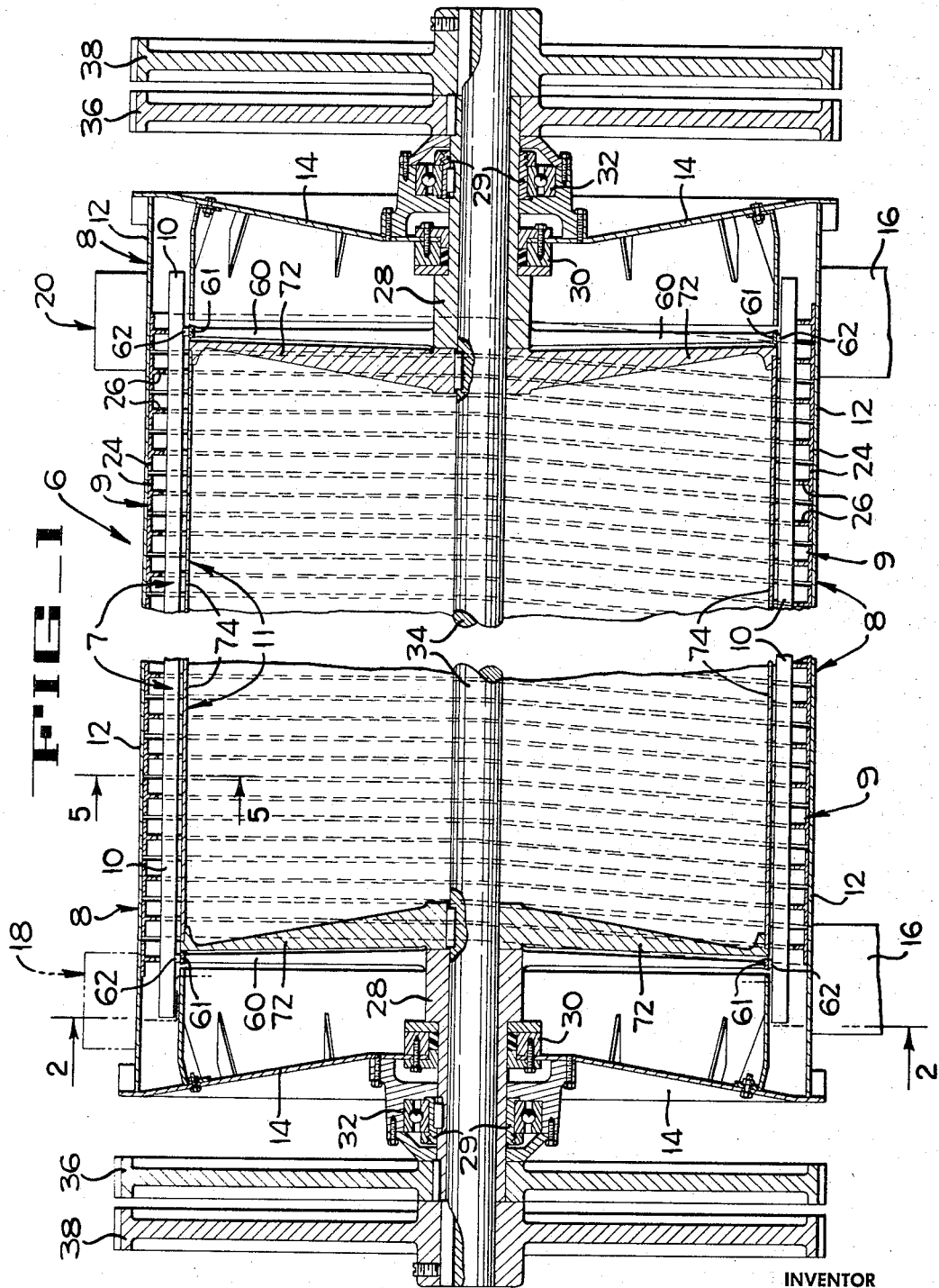
INVENTOR
SAMUEL A. MENCACCI
BY *Hans G. Hoffmeister.*
ATTORNEY Oct. 17, 1967     S. A. MENCACCI     3,347,155
HEAT-TREATING DEVICE
Filed Oct. 28, 1965     4 Sheets-Sheet 2
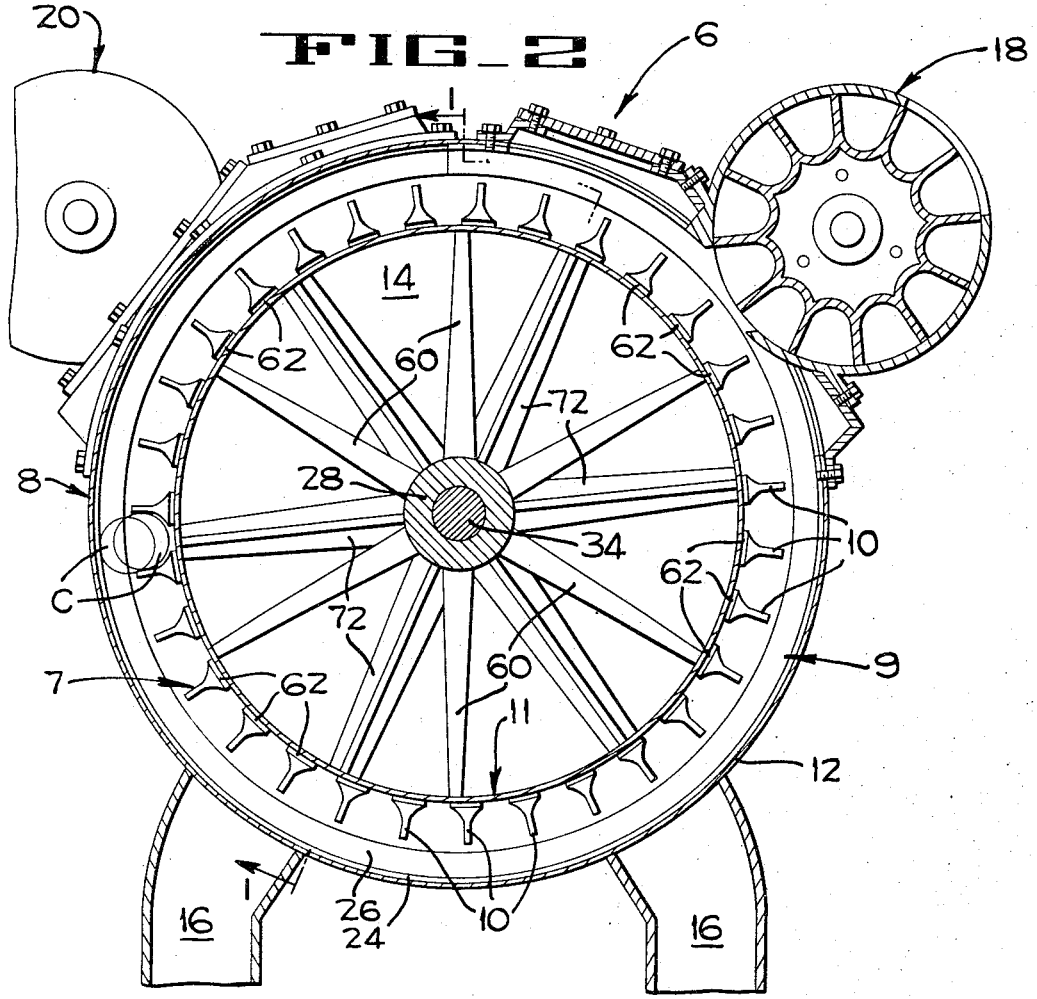
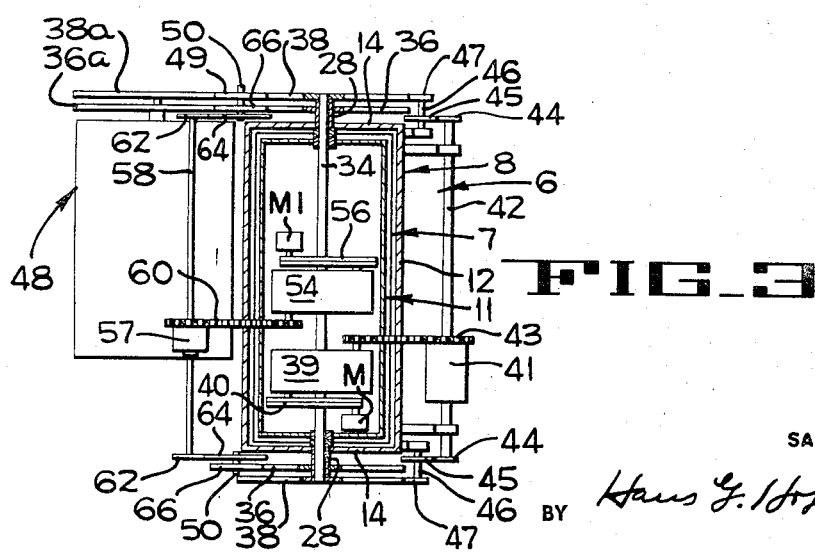
INVENTOR
SAMUEL A. MENCACCI
BY Hans G. Hoffmeister
ATTORNEY Oct. 17, 1967     S. A. MENCACCI     3,347,155
HEAT-TREATING DEVICE
Filed Oct. 28, 1965                                         4 Sheets-Sheet 3
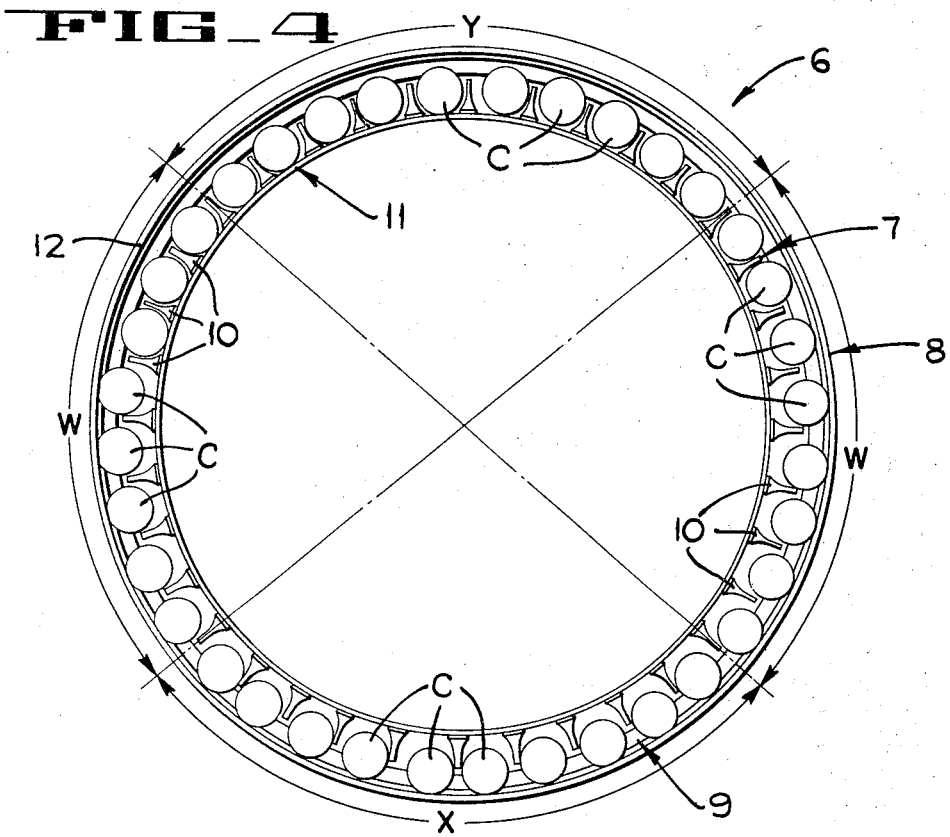
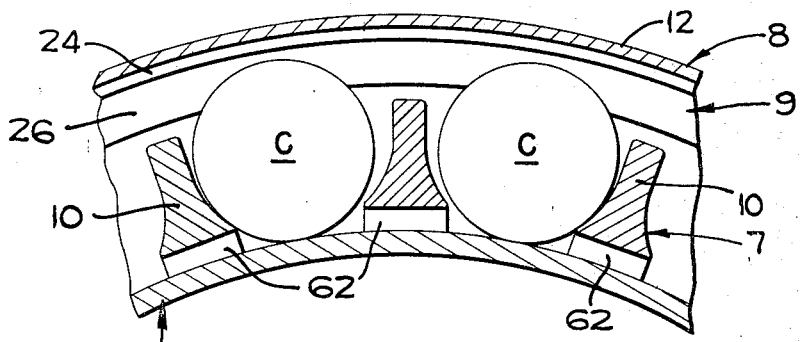
INVENTOR
SAMUEL A. MENCACCI
BY *Hans G. Hoffmeister*
ATTORNEY

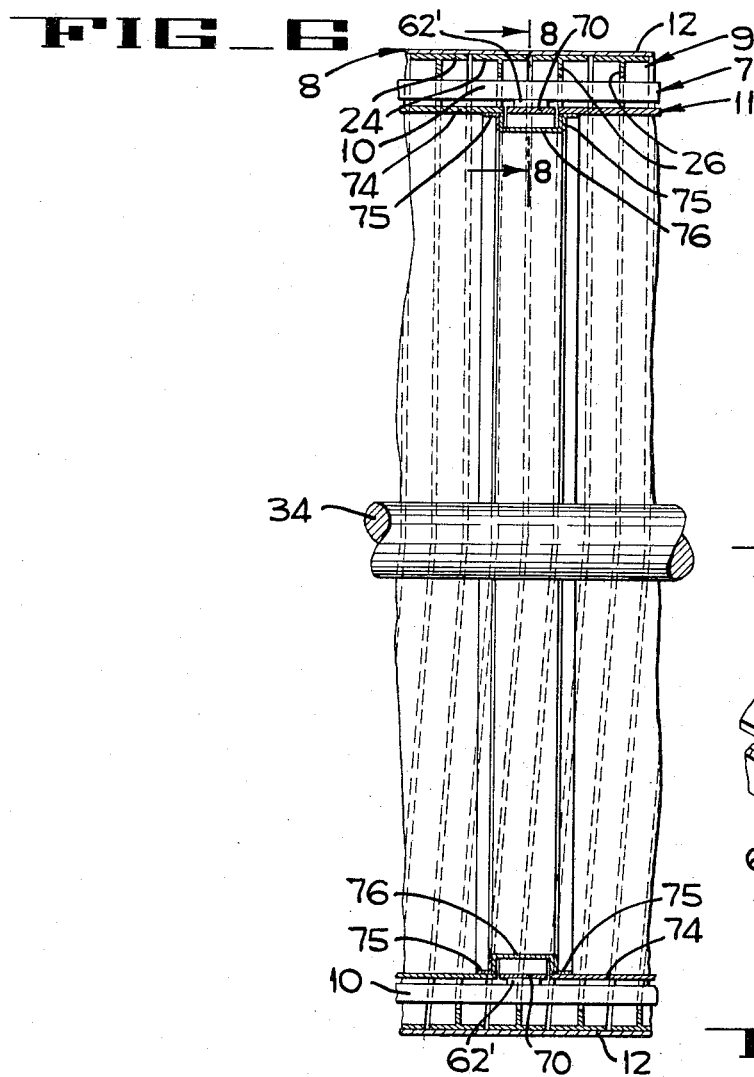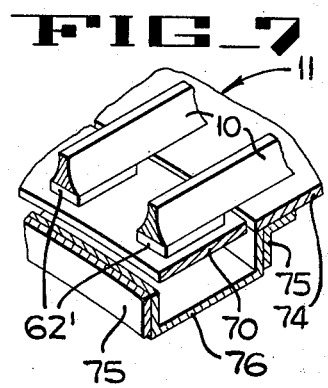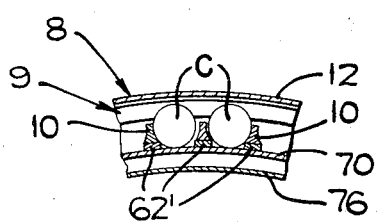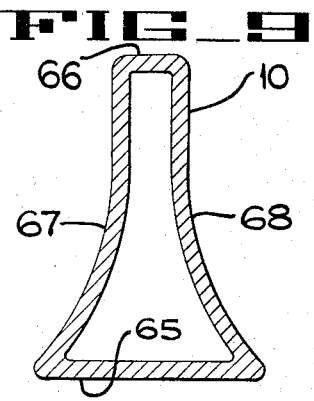
INVENTOR
SAMUEL A. MENCACCI

United States Patent Office 3,347,155
Patented Oct. 17, 1967

3,347,155
HEAT-TREATING DEVICE
Samuel A. Mencacci, Wilrijk, Antwerp, Belgium, assignor to International Machinery Corporation S.A., St. Niklaas-Waas, Belgium, a corporation of Belgium
Filed Oct. 28, 1965, Ser. No. 505,499
3 Claims. (Cl. 99—365)

ABSTRACT OF THE DISCLOSURE

A rotary cooking or cooling apparatus having a stationary spiral for advancing cylindrical containers disposed between spaced parallel bars of a driven reel along a helical path from one end of the apparatus to the other. A drum concentric with and rotatable within the reel and spiral in either direction and at variable speeds for rotating cylindrical containers about their own axes when resting on the drum. A strengthening ring of the same outside diameter as the drum disposed in a recess in the drum and secured to the spaced bars intermediate their ends to strengthen the same.

---

The present invention relates to a heat treating device for processing materials in cylindrical containers and in particular to an agitating drum for a rotary cooker or cooler.

In the commercial processing of food products in containers, such as cans or jars, the usual practice is to subject the containers to a fluid heating medium to sterilize and cook the contents thereof. Uniform and proper processing of the container contents requires that there be no localized over-heating of the contents but that the entire mass of food product in each container be brought to a specific minimum temperature and that the temperature be maintained effectively for a predetermined length of time.

In order to speed up the processing of the canned food product, the fluid heating medium is maintained at a temperature somewhat higher than the desired temperature in the central regions of the container. However, during the time required for the heat to penetrate to the central regions of the cylindrical container, the contents of the container in the vicinity of the cylindrical container walls are subject to over-heating and consequent food softening, burning or other deterioration. To overcome this heat transfer problem, a limited amount of agitation has been employed when handling certain products in reel and spiral types of sterilizers whereby the entire contents of each container may be brought to a uniform cooking temperature; and after the cooking has been completed, may be cooled to a uniform discharging temperature thus quickening the entire heat treatment operation. However, the degree of agitation obtainable with known reel and spiral sterilizers has been quite limited, since rotation of the containers about their own axes usually occurs only when the containers are moving through a small arcuate range around the lower half of the sterilizer. This is so because it is only in the lower half of the sterilizer that gravity holds the containers against the stationary spiral while the rotating reel causes the containers to rotate about their own axes as they move through this small arcuate range, which is between about 100° and 120°.

In accordance with the present invention, it has been discovered that the sterilizing process can be greatly improved when handling certain products, such as citrus juice and citrus concentrates, if the containers are not only rotated about their axes when moving around the lower portion of the sterilizer but also when moving around the upper arcuate portion of the sterilizer.

It is, therefore, one object of the present invention to provide a heat treating device of the reel and spiral type for agitating the contents of the containers when the containers are moving around the upper portion of the device.

Another object is to provide a heat treating device having agitating means which may be readily adjusted so as to control the degree of agitation in accordance with the product being processed.

Another object is to provide for effective agitation of containers in a device for processing material in cylindrical containers.

Another object is to provide a drum which rotates independently of a container supporting reel and frictionally engages the containers during a portion of their travel in a rotary food processing device.

Another object is to provide an improved container supporting reel for a rotary device for processing material in cylindrical containers.

Another object is to provide improved container supporting bars in a device for processing material in cylindrical containers.

Another object is to provide an improved drive apparatus for a container supporting reel and agitating drum.

Another object is to provide a cooker and cooler combination utilizing the additional agitating drum of the present invention.

These and other objects and advantages of the present invention will become apparent from the following description and the accompanying drawings, in which:

FIGURE 1 is a longitudinal section of a heat treating device for processing material in cylindrical containers taken along the lines 1—1 of FIGURE 2.

FIGURE 2 is a vertical transverse section taken along the lines 2—2 of FIGURE 1.

FIGURE 3 is a diagrammatic plan showing a combined cooker and cooler, each provided with the agitator of the present invention and showing a typical drive arrangement and with certain parts of the cooker being shown in section.

FIGURE 4 is a diagrammatic transverse view showing the positions of the containers in various portions of their travel around a rotary cooker or cooler.

FIGURE 5 is an enlarged section taken along the lines 5—5 of FIGURE 1.

FIGURE 6 is an enlarged longitudinal central section showing the central supporting structure of the reel and drum with parts broken away.

FIGURE 7 is an enlarged perspective of a portion of the central supporting structures shown in FIGURE 6.

FIGURE 8 is a section taken along the lines 8—8 of FIGURE 6 with parts broken away.

FIGURE 9 is an enlarged section of a modified form of an improved container supporting bar of the present invention.

Although, as aforementioned, the heat treating device of the present invention is applicable to other rotary container processing equipment, the following description will refer primarily to a rotary cooker of the reel and spiral type described in the patent to Thompson, Re. 15,334, reissued April 11, 1922.

Briefly, a rotary cooker 6 (FIGS. 1 and 2) of the type described in the patent to Thompson, comprises a container supporting reel 7 which rotates within a large heated cylindrical housing 8 having spiral guides 9 on its internal surface. When the reel rotates, the containers, which are disposed with their long axis parallel to the axis of the reel, are guided and moved along the length of the reel by the spiral 9. While they are in the lower portion of the cooker, the containers are rolled in the spiral to partially agitate the material in the containers and thereby improve the heat transfer characteristics.

One form of this invention comprises adding a rotating drum 11 inside the reel 7 and designing the container supporting rails 10 on the reel 7 so that the containers can project through the rails and rest on the rotating drum when the containers are in the upper portion of the cooker. Thus, in accordance with the present invention, the containers are in engagement with relatively moving surfaces in the top as well as in the bottom of the cooker and, there is increased agitation and an increase in the rate at which heat is transferred from the heating medium, which acts on the external surfaces of the container, to the material in the center of the container.

More specifically, the pressurized rotary cooker 6 comprises the housing 8 which includes a cylindrical shell 12 having its ends closed by a pair of fluid retaining end walls 14 and being mounted on any suitable support, such as legs 16. Mounted on the shell 12 are a can inlet mechanism 18 (FIG. 2) and a can outlet mechanism 20 which are preferably of the rotary valve type so as to permit ingress and egress of the cans without loss of pressure or fluid from inside the cooker. The mechanisms 18 and 20 may be of conventional construction similar to that shown in United States Reissued Letters Patent to A. R. Thompson No. 15,334, dated April 11, 1922. Mounted on the internal wall of shell 12 is the spiral which provides spaced guide rails 9, shown in dotted lines in FIGURE 1. The spiral 9 is slanted or has a lead portion only in the bottom half of the shell 12, the reason for this being more fully explained later in the specification. The spiral 9 is T-shaped in cross-section, as seen in FIGURE 1 and cooperates with adjacent flights to define an endless channel-shaped track having an end wall made up of two adjacent members 24 of the spiral and a pair of side walls 26.

A pair of spaced tubular reel shafts 28 are each rotatably mounted in bearings 32 having their outer races fixed to associated end walls 14 of the cooker and having their inner races clamped to sleeves 29 that are keyed to associated ones of the tubular reel shafts 28. A packing gland 30 is provided around each tubular shaft to prevent the loss of pressure or fluid from within the cooker. Journaled in the tubular reel shafts 28 is a drum shaft 34 which extends through the cooker along the longitudinal axis thereof. Keyed to the tubular reel shafts 28 and the drum shaft 34, respectively, are drive gears 36 and 38. Gears 36 and 38 are driven independently by variable speed drives so that the relative speed of the two gears may be varied; or if desired, so that gears 38 may be rotated in a direction opposite to that of gears 36.

The variable speed drive arrangement for the drum 11 is shown schematically in FIGURE 3, and comprises a motor M that is connected to a variable speed drive mechanism 39 by a belt drive 40. The mechanism 39 is connected to a clutch-brake assembly 41 on a shaft 42 by a chain drive 43. The shaft 42 drives the gears 38 through gear trains, each of which include a gear 44 secured to the shaft 42 and meshing with a gear 45 keyed to a stub shaft 46. A gear 47 keyed to the stub shaft 46 meshes with the associated gear 38 on the drum shaft 34. If the cooker 6 is associated with a cooler 48, as shown in FIGURE 3, one of the gears 38 of the cooker 6 drives a corresponding gear 38a of the cooler in the same direction through an intermediate gear 49 which is journaled for free rotation on one of a pair of stub shafts 50.

The reel 7 of the cooker 6 is driven by a motor M1 which is connected to a variable speed drive mechanism 54 by a belt drive 56. The output shaft of the variable speed drive mechanism is connected to a clutch brake assembly 57 on a power transmitting shaft 58 by a chain drive 60. Each end of the shaft 58 has a gear 62 keyed thereto, and each gear 62 meshes with a gear 64 that is keyed to an associated one of the stub shafts 50. A reel drive gear 66 is also keyed to each shaft 50 and meshes with the associated gear 36 of the cooker thereby driving the reel 7 of the cooker 6. As illustrated in FIGURE 3, one of the reel drive gears 66 also meshes with a gear 36a of the cooler 48 and accordingly drives the cooler reel (not shown) at the same speed as the cooker reel.

The container supporting reel 7 comprises a pair of outer spiders 60 (FIG. 1), each of which is fixed to one of the tubular shafts 28. Each spider includes an outer rim 61 with a series of circumferentially spaced blocks 62 (FIG. 2) welded thereto. Mounted on aligned blocks 62 on each spider are the spaced container supporting rails 10 which run parallel to the longitudinal axis of the cooker 6 for nearly the whole length thereof. A typical rail 10 shown, for example, in FIGURE 9 comprises a radially inner surface 65 which is fixed, as by welding, to blocks 62, an outer end 66, and curved side walls 67 and 68. The shape of the rails provides suitable strength and permits the containers to freely rotate relative to the curved surfaces while the spiral moves the containers between the curved walls of adjacent rails. The rails 10 may be constructed from solid bars, either extruded or rolled; or from stainless steel tubing which is formed by a press to have the above described general contour. As aforementioned, the rails 10 run nearly the full length of the cooker and are supported on blocks 62 which space the rails from the spider rims 61 thereby permitting the containers to be advanced longitudinally of the rails between two adjacent rails without the containers striking either of the rims 61.

When exceptionally long rails are used, such as 50-60 foot rails, it is desirable to provide an additional support midway along the rails. As shown in FIGURES 6 and 7, this support is provided by a ring 70, which has a diameter equal to that of the rims 61, has blocks 62' welded thereon, which blocks are welded to the central portion of the rails 10. The rails are spaced so that containers supported therebetween will extend beyond the inner surfaces 65 of the rails when the can support rails are moving through the upper portion of the cooker and will reset on the periphery of the relatively rotating drum 11. Thus, as can be readily seen, each adjacent pair of rails provides a smooth can support surface running longitudinal substantially the whole length of the cooker.

The rotating drum 11 comprises a pair of inner spiders 72 (FIG. 1) that are keyed to the shaft 34 and have mounted around the circumference of their rims a cylinder 74 which defines a container supporting and rolling surface. The cylinder 74 is relatively inflexible, however, for extremely long drums associated with reel 7 utilizing a stiffening ring 70, the central portion of the cylinder 74 is relieved to accommodate the ring 70. As can be best seen in FIGURES 6 and 7, a pair of annular angle bars 75 are welded to the internal surface of the cylinder 74, and are also welded to the side walls of an annular channel member 76. As clearly shown in FIGURE 7, the channel 76 also provides a recess in the cylinder 74 so that ring 70 may travel therein without rubbing or touching the drum. It should be noted that, in a relatively short cooker, the channel 76, angles 75 and ring 70 are not used. Furthermore the rails 10 and drum 11 are spaced apart sufficiently so that, while the rails never touch the drum, they permit frictional engagement between containers carried by the rails and the drum.

As aforementioned, the spiral 9 has a lead only in the lower portion of the cooker 6. This type of lead is provided so that the containers will move longitudinally between rails 10 parallel to the longitudinal axis of the cooker only while the containers are in the lower portion of the cooker and while they are spaced from the drum 11 as is best shown in FIGURE 4. Thus, with the containers moving longitudinally only while in the bottom portion of the cooker, the containers will not slide longitudinally along the upper portion of the drum 11 and get jammed by the ring 70 or by the recess portion of drum 11. In other words, longitudinal movement of the containers takes place only when the containers are engaging the smooth unbroken sides and end walls of the spiral at the lower portion of the cooker. In relatively short cookers, however, where the drum 11 is unbroken and has neither a recess nor a ring 70, the spiral may have the conventional helix shape with longitudinal movement occurring at all points in the cooker. Such a conventional spiral, in the shape of a helix may be seen in common rotary cookers, a typical one of which (with the exception of the drum 11 and associated structure) is described in the aforementioned patent to Thompson.

The operation of the device is as follows:

Containers C are admitted into the cooker by inlet valve 18 and are received by a pair of adjacent supporting rails 10 (FIGS. 1 and 2). As the rails of the continuously driven reel 7 are revolved around the internal circumference of the cooker, the containers are engaged by the end walls 24 and side walls 26 of the spiral 9. The inter-engagement of the containers by the supporting rails 10 and spiral 9 in the lead portion will cause the containers to move longitudinally along the supporting rails toward the discharge valve 20. In the embodiment shown, the longitudinal movement of the containers occurs only in the bottom half of the cooker, and while in this portion of the cooker the containers are supported on the internal surfaces of the spiral 9. Since the containers passing the center part of the cooker are not resting on drum 11, there is no possibility of the containers becoming jammed against ring 70 or the recessed portion of drum 11. The containers are discharged by the rotary valve 20 which is similar to inlet valve 18.

It will be understood that the heating medium that is directed into the cooker by any suitable means may be steam, hot water, a steam air-mixture, or any combination of these mediums. Water is the heat transfer medium used in the cooler.

As diagrammatically illustrated in FIGURE 4, when the containers move through a lower arcuate range X of about 100° to 120°, the containers are held by gravity against the lower portion of the spiral 9 and rotate about their own longitudinal axes at a rate dependent upon the rotational speed of the reel and supporting rails. When the containers are in the area Y at the extreme upper portion of the cooker, the containers are supported on drum 11 and are rotated about their longitudinal axes at a speed dependent upon the rotational speed of drum 11 and upon the rotational speed of supporting rails 10. Since drum 11 can rotate independently on supporting rails 10 and, if desired, can rotate in a direction opposite to supporting rails 10, the rotation of the containers about their longitudinal axes can be stopped completely or increased to any speed desired. In arcuate areas W, some rotation takes place but it is sporadic since the containers have a tendency to move away from the drum and shell in that area.

From the foregoing description it will be apparent that the drum 11 provides for approximately 100° of additional agitation, which agitation may be controlled as desired for the particular product being processed. By providing additional agitation by means of the drum 11, faster heat transfer from the heating medium to the food being processed in the cans is realized, and as a result more uniform and rapid processing takes place. Likewise, a similar arrangement in the cooler 48 (FIG. 3) permits faster and more efficient cooling after the cans have been heated.

While a preferred apparatus for carrying out the invention has been shown and described, it will be understood that it is capable of modification and variation while still employing the principles of the invention. It is to be understood, therefore, that the scope of the invention should be limited only by the scope and proper interpretation of the claims appended.

Having thus described the invention, that which is believed to be new and protected by Letters Patent is:

1. In a device for processing material in cylindrical containers the combination of rotatable container support means, means for guiding said containers along a predetermined path, said container guiding means having a first container engaging surface for causing said containers to rotate about their longitudinal axes while moving along a certain portion of said path, rotatable drum means having a second container engaging surface to cause said containers to rotate about their longitudinal axes, and means for rotating said support means and said drum means about the longitudinal axis of the processing device, said support means including a strengthening ring and said drum means including a recess to receive said ring.

2. The processing device defined by claim 1 wherein said strengthening ring is disposed intermediate the ends of said container support means, and wherein said means for rotating said support means and said drum means is variable so that the relative speeds and directions of rotation of said support means and drum means can be altered with respect to one another.

3. The processing device defined by claim 1 wherein said strengthening ring is disposed intermediate the ends of said container support means, and further including a cylindrical pressure treating tank, a pressure feed mechanism at one end of said tank for feeding containers into said container support means, said support means including at least two spaced elongated rails, said guiding means including a spiral fixed to said tank and having spaced side walls and an end wall, said rails being mounted for rotation about the longitudinal axis of said tank between said drum means and said spiral whereby containers carried by said rails engage said end wall of said spiral during movement through the lower portion of said tank and engage said drum means during movement through the upper portion of said tank, and a pressure discharge mechanism at the other end of said tank for receiving containers from said support means and discharging the containers from said pressure treating tank.

References Cited

UNITED STATES PATENTS

| | | | |
|---|---|---|---|
| 932,629 | 8/1909 | Mill | 99—365 |
| 1,193,632 | 8/1916 | Thompson | 99—365 |
| 1,579,676 | 4/1926 | Thompson | 99—360 |
| 1,721,562 | 7/1929 | Keeney | 99—365 |
| 2,211,801 | 8/1940 | Thompson. | |
| 2,284,269 | 5/1942 | Eberts | 99—360 |
| 2,362,733 | 11/1944 | Thompson et al. | 99—361 |
| 2,584,474 | 2/1952 | Krueger | 99—360 |
| 2,695,556 | 11/1954 | Novothy | 99—365 |
| 2,804,011 | 8/1957 | Jones | 99—365 |

BILLY J. WILHITE, *Primary Examiner.*